Patented Apr. 6, 1943

2,315,564

UNITED STATES PATENT OFFICE 2,315,564

ART OF COATING AND FABRICATING STEEL ARTICLES

John S. Thompson and Edwin W. Goodspeed, Detroit, Mich., assignors to Parker Rust-Proof Company, Detroit, Mich.

No Drawing. Application March 27, 1941, Serial No. 385,526

8 Claims. (Cl. 148—6.5)

This invention relates to the chemical treatment of ferrous metal, and more especially to improving its paint holding properties.

A number of processes are known that can be employed for this purpose. Insoluble phosphate coatings chemically produced by reacting metallic surfaces with hot acid phosphate solutions have been used for a number of years. Insoluble ferrous oxalate coatings have also been produced by reacting the steel with solutions containing oxalic acid with or without oxidizing agents. Coatings that are predominately oxides of the metal treated are also effective in promoting paint adhesion. Solutions containing chromic acid and so-called activator ions have also been employed. The so-called activator ions comprise ions from acids such as sulphuric, nitric and phosphoric and salts of some of these acids, and also halogen ions and ferricyanide ions. A disclosure of the use of certain activator ions is made in the patent of Gerald C. Romig, 2,114,151, April 12, 1938. Likewise, electrolytic processes employing chromic acid and so-called activator ions have been used for treating steel surfaces.

The object of the present invention is to provide a simpler and less expensive method of increasing paint adhesion to steel surfaces. It has been found that chromic acid free of activator ions may be employed for this purpose by applying it to the bare metal in a non-electrolytic process and with certain heat treatment.

It is necessary when using the chromic acid solution that it is applied in such a way that it provides a substantially uniform coverage of the surface and that it or its reaction products become an integral part of the article which should not be removed.

The invention may be carried out in one of three ways. First, a film of a solution of chromic acid may be formed upon the surface to be coated and this film may be baked on at an elevated temperature so as to produce chemical reaction and dry the film and render it substantially insoluble in water. Second, the surface to be coated may be kept in contact with the solution of chromic acid at an elevated temperature for a period of time and then a film of the solution may be dried on with just sufficient heat to dry the film. Third, the surface to be coated may be brought in contact with a solution of chromic acid sufficiently concentrated to have an elevated boiling point and at a temperature sufficient to produce a reaction at the surface of the work and thereafter the solution may be rinsed off.

In the third process while the drying of a film of a relatively dilute solution of chromic acid upon the treated surface is advantageous for some purposes it is not necessary.

It has been found that regardless of the concentration of the chromic acid its effectiveness for any given period of immersion increases with the temperature. Thus, a temperature of 150° F. is superior to 100° F. and 212° F. is in turn superior to 150° F., and as indicated, a temperature well above 212° F. is needed if a satisfactory coating is to be produced without drying the solution onto the surface.

The following examples are given to illustrate the immersion method of applying the chromic acid.

1. Steel panels were immersed in a solution containing 6 pounds of the acid per 100 gallons of water for two minutes at 212° F. after which they were removed, drained, and force dried for 4 minutes at 250° F.

2. Panels were treated exactly as in Example 1 except the treatment was at a temperature of 180° F.

3. Other panels were treated exactly the same as in Examples 1 and 2 except that concentrations of chromic acid were used of 8, 10, and 15 pounds per 100 gallons. These panels were given two coats of black baking enamel and were tested in the salt spray along with painted but untreated steel panels. At the end of 600 hours the paint on the untreated steel was a complete failure, whereas that on the chromic acid treated panels was practically unaltered, rating 100% perfect in the great majority of cases.

Lower concentrations of chromic acid are also effective. Amounts as low as 1 pound per 100 gallons have been used with success. In this case, as with larger amounts of the acid, the higher temperatures are more effective.

Satisfactory results were also obtained with the following procedures.

4. Treatment with chromic acid at 1 pound per 100 gallons at 212° F. for 5 minutes, after which the panels were allowed to air dry.

5. Same as Example 4 except the panels were force dried (baked) for 4 minutes at 240° F.

6. Solutions of the acid were used at 3 pounds per 100 gallons, otherwise the same conditions as for Examples 4 and 5.

7. Panels were run according to Examples 4, 5 and 6 except that a processing temperature of 180° F. was used with an immersion time of 2 minutes.

A large variation may be made in the concentration of the acid, the time of processing, the temperature of processing, and the temperature at which the articles are dried. For example, the strength of the acid solution may be many times the highest given in the specific examples above. A longer time of processing than 5 minutes may also be used. The baking temperature can be as high as 600° F. without detrimental results.

8. Chromic acid is an extremely soluble material. Therefore, high concentrations are possible. In this particular example a concentration equivalent to 850 pounds of the acid per 100 gallons of aqueous solution was used and heated to the boiling point which was 246° F. Steel panels were immersed and allowed to remain 5 minutes and others for 15 minutes after which they were withdrawn and thoroughly rinsed with water. A definite reaction was found to have been obtained. The panels treated for 5 minutes had taken on a pleasing deep yellow color while those treated for 15 minutes had assumed a deep purple appearance. In both cases the colored coating was firmly adherent to the base metal.

Lower concentrations of the acid can, of course, be used to obtain variations in the shade produced. The tendency to form the colored coatings becomes less with weaker concentrations. In carrying out this form of the invention, it is preferable to employ a solution having a boiling point at least as high as 221° F. At the concentration which results in this boiling point, and at the boiling temperature, it requires approximately an hour to produce a substantial coating, although the surface may be affected in less time sufficiently to increase the adherence of painted and the resistance of the painted surface to corrosion. Substantially the same results may be obtained by employing dichromate, such as chromium dichromate for example, along with chromic acid in the solution to raise the boiling temperature as by raising the boiling temperature the same amount by addition of chromic acid alone.

Variations in the processing time also have an influence on the shade obtained.

The following illustration is given as embodying conditions that can easily be carried out and are in keeping with industrial practice and demands.

The steel is first cleaned of oil and other adhering matter by spraying it in a conventional washing machine with a water solution of any of the usual alkali cleaners obtainable on the market. After the metal has been sufficiently cleaned, it will, after rinsing, retain a substantially continuous film of cold water (this is a recognized test used to determine the cleanliness of a metallic surface). The article may then be immersed in a chomic acid solution having a concentration of 6 pounds per 100 gallons of water which is maintained at 212° F. After an immersion of two minutes the article is withdrawn, drained, and then force dried for 4 minutes at 240° F. After cooling it is ready for painting without further operations being necessary.

As stated before, an alternative method of using the acid solution is by applying a film of it. This may be done by brushing, spraying, or by dipping the article and allowing the excess to drain off. The film is then baked to render it sufficiently dry so the treated article can be handled, and to produce a chemical reaction that renders the dried film non-hygroscopic and substantially insoluble in water. Spraying with the conventional paint spray gun is the most convenient way to apply the film and is usually preferable.

Chromic acid solutions have a rather oily nature in that they wet a metal surface only with difficulty. Since the effect desired in the way of paint adhesion is obtained only if the treatment is uniform, it is sometimes desirable to incorporate wetting agents in the solutions. These become increasingly important with higher concentrations of the acid. Inasmuch as chromic acid is an oxidizing agent and most wetting agents are decomposed by it at a more or less rapid rate, it is necessary to select those that are relatively stable. Of a number that have been investigated it was found that the Gardinols and Duponols (trade names) are satisfactory. These are basically sodium lauryl sulfate.

The following examples are given to illustrate the method of applying the chromic acid as a film.

9. A solution of 7 pounds per 100 gallons of chromic acid containing 1.5% Gardinol was applied to panels by spraying until the surface was uniformly wetted. They were then baked for 10 minutes at 500° F. After they were cooled they were rinsed in a solution of chromic acid having a concentration of 4 grams per gallon at a temperature of 170° F. then air dried. The purpose of the chromic acid rinse is to reduce blistering of paint and also to obtain the maximum paint adhesion. This step, for some unknown reason, is more necessary with this method of application than where the metal is processed in the acid solution for a short time.

The conditions of the acid rinse may be varied widely and satisfactory results still be obtained. A 10 gram per gallon rinse has been used successfully. The time of the rinse as well as its temperature can be subjected to considerable variation.

10. Solutions of the acid having concentrations of 300, 600, 1200, 2400 and 4000 grams per gallon of water may also be employed in exactly the same manner.

11. Panels treated with high concentrations of chromic acid require somewhat different baking conditions to prevent the acid film from being hygroscopic. For example, when a solution of 376 grams per 4 liters of water containing 4 grams of Gardinol was used and applied by dipping and the panels baked 10 minutes at 400° F., the surfaces became damp on standing over night. A baking time of 20 minutes did not overcome the difficulty. However, a bake of 500° F. for 20 minutes or 600° F. for 10 minutes was sufficient so that the panels remained dry indefinitely. It appears, therefore, that a sufficiently high temperature is more important than an increase in the baking time. When higher concentrations of chromic acid are used the panels upon baking assume a deep brown to gun-metal color, the variation depending somewhat upon the time of baking and also the temperature used.

12. Five (5) and 10% solutions of chromic acid containing 1% Duponol were applied to steel panels by spraying. Some were allowed simply to air dry, others were baked 4 minutes at 300° F. and others 4 minutes at 500° F. These were then painted with enamel and then tested in salt spray. All produced paint adhesion far superior to that obtained on panels which were untreated but painted and tested in the same manner.

If desired, the metal before processing with the acid may be heated since this will promote the action of the acid. Preheating is also advantageous where the metal is to be sprayed because it permits the use of lower amounts of wetting agent. If the preheating temperature is sufficiently high the wetting agent may be dispensed with altogether.

The described invention is of a special value for application to sheet metal before fabrication since the treatment does not interfere in any way with welding operations. Steel which has been treated according to any of the methods described in the examples may be welded with the same ease as untreated metal. This is an important requirement of any treating method applied to prefabricated metal because welding operations are practically universal.

Of course, the present invention may also be used on fabricated articles.

With the present invention any cleaning method desired may be employed without the necessity of wiping. The present invention is limited to one necessary ingredient, namely, chromic acid. This allows the simplest kind of control of the solution.

The coatings obtained in accordance with this invention are corrosion resistant without applying any finish coat. However, the main purpose of the invention is to obtain a coating over which the usual finish coats are applied. We have discovered that the coatings obtained can be applied to the iron and steel surfaces prior to fabrication. In other words, the steel, after it has been treated in accordance with this invention, may then be temper rolled, welded and drawn without destroying entirely the corrosion resistant effect of the coating. After the articles have been fabricated, the finish coat may be applied at that time and it will be found that the sheets treated in this way are more corrosion resistant than sheets which have not been given a chemical coating. One form of this invention, therefore, is obtaining the chemical coatings of this invention upon surfaces of iron and steel, and thereafter subjecting the surfaces to steps in the fabrication of finished articles such as temper rolling, welding, drawing and stamping, and thereafter applying any of the usual finish coats.

In carrying out this invention it is to be observed that it is not necessary to employ any electric current to obtain the coating and it is not necessary to employ any of the so-called activator ions in the chromic acid solution. Further, it is not necessary to employ any subsequent chemical treatments after obtaining the chemical coating in accordance with this invention since such subsequent chemical treatments might detract from the value of the coating as a corrosion resistant paint base. However, as above stated, it is sometimes desirable to supply a subsequent treatment with a solution of chromic acid. Generally speaking, this subsequent treatment with a solution of chromic acid involves a solution also free of so-called activator ions, but in some instances if desired, phosphoric acid may be present in the chromic acid solution used in the subsequent treatment. In place of pure solutions of chromic acid for the subsequent treatment, it is understood that solutions of bichromates may be employed. In using bichromates it is preferable to employ bichromates which set free in the solution a greater amount of chromic acid than the alkali bichromates such as sodium, potassium and ammonium, although these latter may be used with some advantage. If a subsequent treatment with chromic acid or bichromate is used, the solution is dried upon the surface prior to the application of the final finish coat and is not rinsed off.

In the appended claims when the term "activator ions" is employed, it is understood that by this expression is meant the activator ions previously referred to in the specification.

Of course, in most instances the treating solution will contain reaction products of the solution with the iron and steel of the surface being treated. It is understood that the appended claims do not exclude from the solution or the coating these reaction products. Ferric dichromate will undoubedly be formed in the solution. In fact, a solution of ferric dichromate may be used in carrying out this invention, as an example of which we give the following:

A 10% solution of ferric dichromate containing 1% wetting agent was applied by spraying and baked 10 minutes at 550° F.

The term "siccative coatings" as used in the appended claims, signifies any of the usual finish coats which are placed on metallic surfaces such as paints, lacquers, enamels, oils, stains, and the like.

Where dilute solutions are used and the coatings of the invention are obtained by drying the solution onto the iron and steel surfaces as previously mentioned, a subsequent treatment with a solution of chromic acid or a bichromate may be employed. In this case the iron and steel surfaces are first treated as previously described, the insoluble coating is obtained by drying the treating solution onto the metallic surfaces, and thereafter said coating is treated with the chromic or bichromate rinse solution. In this case it is not necessary to employ a water rinse before the chromic rinse. Where, however, the insoluble coating is obtained on the iron or steel surfaces by immersing the surfaces in the solution until a visible coating is obtained, as is possible with the more concentrated solutions, then it is sometimes desirable to first rinse the coating with water before applying the subsequent chromic or bichromate rinse.

While a number of variations of the invention have been described in considerable detail, it will be readily understood that other variations may be made within the scope of the invention as defined in the appended claims and in accordance with the general directions given above. The coatings produced by all of these variations have this in common that they are harder and more adherent than coatings produced with electrolytic aid or with activator ions, and also they can be made uniform while still very thin, thus avoiding the difficulty encountered with the other process mentioned resulting from their tendency to be spotted when first becoming visible.

Also this invention affords ready means to vary the color to a material extent in order to produce a pleasing appearance when the surface is to remain exposed, at least for a sufficient time so that its appearance is a matter of concern. Where the solution is applied and baked on, the color may be varied from a light yellow or straw color to jet black by variation in the heat treatment, while boiling in a strong solution can produce still greater variations in color as indicated in connection with the specific examples. Therefore, while the main purpose of the invention is to prepare the surface for a siccative coat, it may be employed to produce a surface having a pleasing appearance, capable of wide control by varied heat treatment, and having a materially increased resistance to corrosion.

What we claim is:

1. In the art of obtaining corrosion-resistant paint-holding coatings upon surfaces of sheet iron or steel articles by means of non-electrolytic chemical treatment, the process which comprises applying to surfaces of sheet iron or steel a film of an aqueous solution of chromic acid free from activator ions, baking the film to dry it and bring about a chemical reaction rendering it substantially insoluble, then fabricating the sheets into articles, and thereafter applying over said chemical coating a siccative coating.

2. In the art of obtaining corrosion resistant paint holding coatings upon surfaces of iron and steel by means of non-electrolytic chemical treatment, the process which comprises applying to surfaces of iron and steel a film of an aqueous solution of chromic acid free from activator ions, baking the film to dry it and bring about a chemical reaction rendering it substantially insoluble, and thereafter applying over said chemical coating a siccative coating.

3. In the art of obtaining corrosion resistant paint holding coatings upon surfaces of iron and steel by means of non-electrolytic chemical treatment, the process which comprises applying to surfaces of iron and steel a film of an aqueous solution of chromic acid free from activator ions, baking the film to dry it and bring about a chemical reaction rendering it substantially insoluble, thereafter rinsing the surface in a dilute solution of chromic acid, drying the solution on the surface, and thereafter applying over said chemical coating a siccative coating.

4. In the art of obtaining corrosion resistant paint holding coatings on iron and steel surfaces by means of non-electrolytic chemical treatment, the process which comprises treating at an elevated temperature surfaces of iron and steel with a dilute aqueous solution of chromic acid free of activator ions until a chemical reaction results, and drying the chromic acid solution upon the metallic surface and thereafter applying to the dried coating a siccative coating.

5. In the art of obtaining corrosion resistant paint holding coatings upon surfaces of iron and steel by means of non-electrolytic chemical treatment, the process which comprises applying to surfaces of iron and steel at a temperature of at least 221° F. an aqueous solution of chromic acid free from activator ions and having a boiling point at least as high as 221° F. until the chemical reaction produces a visible coating on the surface, rinsing the coated surface, and thereafter applying over the coated surface a siccative coat.

6. In the art of obtaining corrosion-resistant, paint-holding coatings upon surfaces of iron or steel, the process which consists in applying to a surface of iron or steel an aqueous solution containing chromic acid as its only essential chemical, and heating a film of the solution on the surface until the film is dried into a visible, substantially insoluble coating.

7. In the art of obtaining corrosion-resistant, paint-holding coatings upon surfaces of iron or steel, the process which consists in applying to a surface of iron or steel an aqueous solution containing chromic acid as its only essential chemical, and sufficiently concentrated to have a boiling point above 221° F., and keeping the solution in contact with the surface at a temperature above 221° F. until a visible, paint-holding coating is produced on the surface.

8. In the art of obtaining corrosion-resistant, paint-holding coatings upon surfaces of iron or steel, the process which consists in applying to a surface of iron or steel an aqueous solution containing chromic acid as its only essential chemical, heating a film of the solution on the surface until the film is dried into a visible, substantially insoluble coating, and applying and drying onto the coated surface of a film of a second chromic acid solution more dilute than the first.

JOHN S. THOMPSON.
EDWIN W. GOODSPEED.